(12) United States Patent
Goodjohn

(10) Patent No.: US 8,180,281 B2
(45) Date of Patent: May 15, 2012

(54) SYSTEM AND METHOD FOR CONTROLLING A MOBILE REPEATER

(75) Inventor: Paul Goodjohn, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 781 days.

(21) Appl. No.: 12/343,024

(22) Filed: Dec. 23, 2008

(65) Prior Publication Data

US 2010/0159824 A1    Jun. 24, 2010

(51) Int. Cl.
*H04B 7/15* (2006.01)
(52) U.S. Cl. .......................... 455/11.1; 455/7
(58) Field of Classification Search ............. 455/7, 11.1
See application file for complete search history.

(56) References Cited

U.S. PATENT DOCUMENTS

| | | |
|---|---|---|
| 4,056,779 A | 11/1977 | Toler |
| 4,056,780 A | 11/1977 | Faulkner |
| 4,234,959 A | 11/1980 | Andrea, III et al. |
| 4,539,706 A | 9/1985 | Mears et al. |
| D290,842 S | 7/1987 | Scheid et al. |
| 5,056,152 A | 10/1991 | Truby et al. |
| 5,109,526 A | 4/1992 | Reed |
| 5,239,666 A | 8/1993 | Truby |
| 5,371,901 A | 12/1994 | Reed et al. |
| 5,551,064 A * | 8/1996 | Nobbe et al. .................... 455/62 |
| 5,699,354 A * | 12/1997 | Gulliford et al. ............. 370/315 |
| 5,768,683 A | 6/1998 | Mulford |
| 5,857,144 A * | 1/1999 | Mangum et al. ............. 455/11.1 |
| D411,536 S | 6/1999 | Page et al. |
| 5,915,208 A | 6/1999 | Collyer |
| 6,141,533 A | 10/2000 | Wilson et al. |
| 6,647,244 B1 | 11/2003 | Haymond et al. |
| 6,718,158 B1 * | 4/2004 | Suonvieri ......................... 455/9 |
| 6,768,897 B1 * | 7/2004 | Suonvieri ....................... 455/15 |
| 6,785,511 B1 | 8/2004 | Hengeveld et al. |
| 6,795,685 B2 | 9/2004 | Walkup |
| D497,887 S | 11/2004 | Robertson, Jr. et al. |
| 6,941,137 B2 * | 9/2005 | Park .............................. 455/423 |
| 7,003,261 B2 * | 2/2006 | Dietz et al. ................... 455/11.1 |

* cited by examiner

*Primary Examiner* — Khai M Nguyen
(74) *Attorney, Agent, or Firm* — Fox Rothschild, LLP; Robert J. Sacco

(57) ABSTRACT

A system and method for controlling a mobile repeater are provided. The method includes determining a signal level for each of a plurality communication sites adjacent the repeater. The method further includes assigning a communication frequency to the repeater based on the determined signal levels for the plurality of communication sites adjacent the repeater.

18 Claims, 4 Drawing Sheets

SYSTEM AND METHOD FOR CONTROLLING A MOBILE REPEATER

BACKGROUND OF THE INVENTION

This invention relates generally to wireless communication systems, and more particularly, to wireless communication systems providing radio frequency (RF) transmissions.

Wireless communication systems may provide communication between individual users and/or between groups of users, such as in a trunked radio system. For example, radio frequency communications between land mobile radios (LMRs) may allow messages to be communicated between two users or between one or more groups of users. In particular, these LMR systems may be designed to support Push-To-Talk (PTT) services, such as a dispatch mode of operation, wherein a dispatcher from a central location communicates with one or more LMRs or when multiple LMRs inter-communicate, such as emergency personnel responding to an emergency at a building. For example, emergency rescue personnel, such as firemen, policemen, and paramedics often use trunked radio systems when communicating at an emergency scene. It is important for the different rescue personnel to communicate with each other and with the dispatcher. For example, if a fire fighter is fighting a fire in a tall building and he/she is unable to communicate to others that he/she needs backup, that fire fighter's life may be in danger and he/she may be prevented from saving victims' lives because he/she is unable to communicate his/her need for backup.

A mobile repeater may be used to extend the range or coverage of a trunked radio system. For example, a mobile repeater located on the top of a fire truck may be used to extend the communication range of an LMR up to higher floors of a building. In existing systems, when new mobile repeaters enter a communication area, for example, when multiple fire trucks pull up to a building or arrive at the scene of an incident, particularly at the same time, coordination of the multiple mobile repeaters is difficult. The coordination also may be time consuming, as the process to register the repeaters with communication towers or communication sites is a manual process.

Existing mobile repeaters have to be defined within the programming of the LMR as a predetermined mode of operation. Accordingly, a user has to manually change to the mode of operation or manually switch between communication towers or communication sites stored within the LMR, for example, when reaching an incident where the repeater is to be used. Thus, coordination and pre-programming is required for all LMR units at a particular incident or event. Moreover, existing systems do not allow for preprogramming for use of multiple mobile repeaters at a single site. Accordingly, coordination of multiple mobile repeaters at an incident or event requires careful and time consuming configuration at the incident or event.

BRIEF DESCRIPTION OF THE INVENTION

In one embodiment, a method for controlling communication using a mobile repeater is provided. The method includes determining a signal level for each of a plurality communication sites adjacent the repeater. The method further includes assigning a communication frequency to the mobile repeater based on the determined signal levels for the plurality of communication sites adjacent the mobile repeater.

In another embodiment, a method for resolving contention between a plurality of mobile repeaters is provided. The method includes determining a signal level for each of plurality of adjacent communication sites. The method further includes assigning to each of a plurality of mobile repeaters a communication frequency based on a signal level of the plurality of adjacent communication sites. The communication frequency is assigned as a mobile repeater enters an area having another mobile repeater therein.

In yet another embodiment, a radio communication system is provided that includes a plurality of mobile repeaters each provided as part of a vehicle and a plurality of portable units communicating using the plurality of mobile repeaters. The radio communication system further includes a mobile repeater frequency selector configured to automatically assign communication frequencies to each of the mobile repeaters based on a determined signal level of adjacent communication sites.

DETAILED DESCRIPTION OF THE INVENTION

Figure 1:
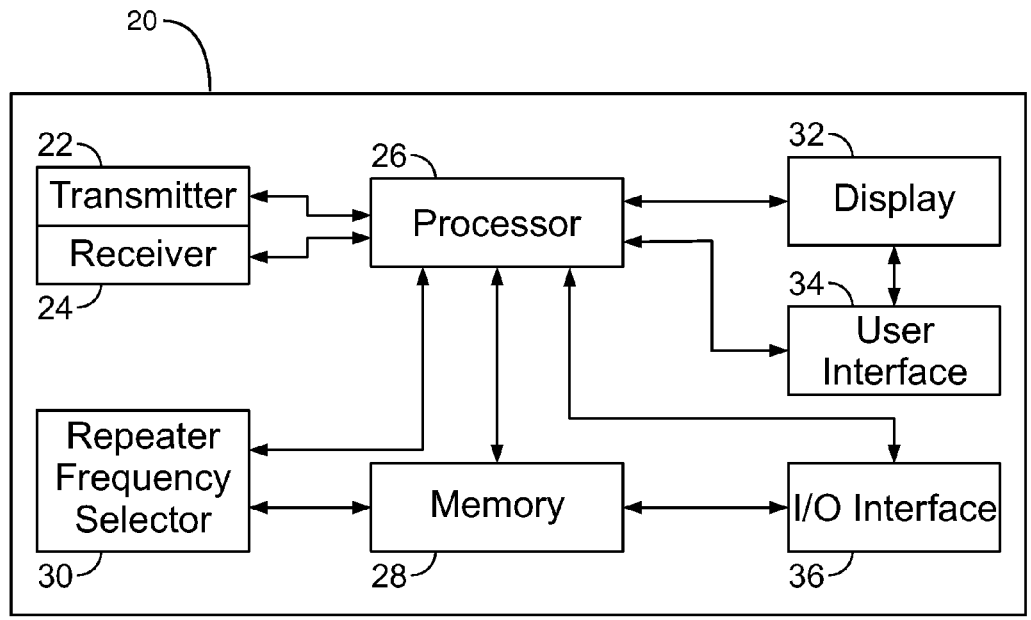
FIG. 1 is a block diagram of a land mobile radio (LMR) constructed in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide a system and method for controlling operation of a mobile repeater, and more particularly, for automatically selecting a frequency on which the repeater, for example, a mobile or vehicle repeater communicates. The selection of a frequency for mobile repeater communication is determined based on adjacent site information and signal level.

Although the various embodiments may be described in connection with a particular radio unit, communication system or communication protocol, the various embodiments may be implemented in connection with different radio units communicating using different systems or protocols. For example, the radio unit may be any kind of radio capable of transmitting wirelessly, for example, transmitting over the Public Safety Frequency Bands within the VHF, UHF, 700 MHz, 800 MHz and 900 MHz frequencies. Additionally, different communication protocols may be used, for example, one of a Project 25 (TIA 102) or an ETSI TETRA standard or a proprietary format such as an OpenSky M/A-COM proprietary format, a NetworkFirst or EDACS system proprietary format.

Figure 2:
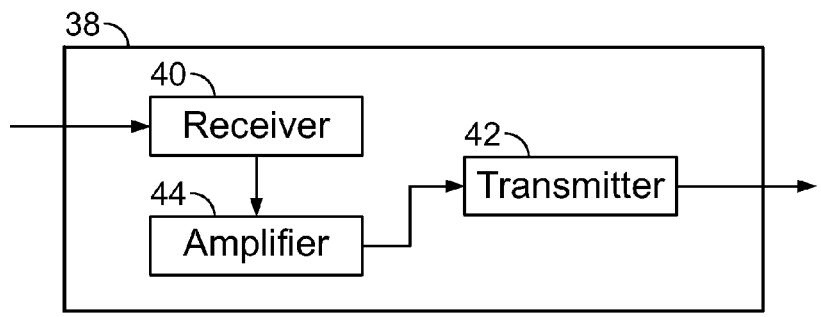
FIG. 2 is a block diagram of a mobile repeater constructed in accordance with various embodiments of the invention.

Various embodiments of the invention provide for extending the communication range of a radio unit 20, for example, a land mobile radio (LMR), as shown in FIG. 1. The radio unit 20 includes a transmitter 22 and a receiver 24, which may be provided separately or as a single unit, for example, as a transceiver. The transmitter 22 and receiver 24 are connected to a processor 26, which is also connected to a memory 28. The processor 26 is optionally connected to a repeater frequency selector 30. In one embodiment, the repeater frequency selector 30 is part of a mobile repeater 38, for example, a vehicle repeater that as shown in FIG. 2 may be provided as part of a vehicle (e.g., a fire truck) and that automatically selects the repeater frequency. Thus, the repeater frequency selection is performed within the mobile repeater 38. In another embodiment, for example, when the radio unit 20 is provided as part of a vehicle that includes the mobile repeater 38, the radio unit 20 includes the repeater frequency selector 30 that is configured to automatically select a frequency on which the mobile repeater 38 communicates.

Referring again to FIG. 1, the radio unit 20 also optionally includes a display 32 that is also connected to the processor 26 and to a user interface 34. An input/output (I/O) interface 36 is connected to the processor 26 and the memory 28. The display 32 may be any type of display capable of displaying text and/or graphics with the user interface 34 including user depressible buttons for entering information or requests. The memory 28 may include one or more portions of non-volatile memory and also may be configured to be removed from the radio unit 20 (e.g., a memory module or flash memory). The memory 28 also may include other types of memory components or portions such as Random Access Memory (RAM) and/or Read Only Memory (ROM) and which may be configured to store different types of information. The I/O interface 36 may be any type of interface or port that allows data to be transferred into and out of the radio unit 20. For example, the I/O interface 36 may be a serial port or Universal Serial Bus (USB) port.

Figure 3:
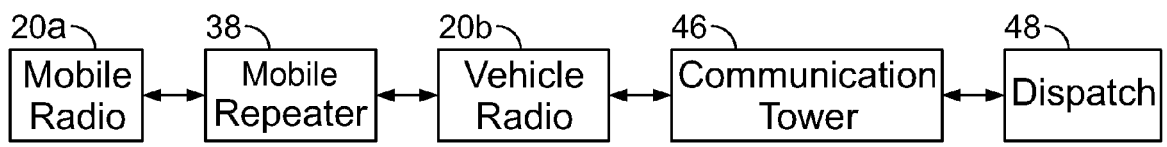
FIG. 3 is a block diagram illustrating communication using a mobile repeater in accordance with various embodiments of the invention.

The mobile repeater 38 as shown in FIG. 2 generally includes a receiver 40 and a transmitter 42. An amplifier 44 is also optionally provided to amplify a signal (e.g., LMR signal) received at the receiver 40 and then transmitted from the transmitter 42. The mobile repeater 38 is configured, for example, to receive a weak or low-level signal and retransmit the signal at a higher level or higher power, such that the signal can cover longer distances without degradation. Thus, as shown in FIG. 3, a radio unit 20a that is configured as a mobile radio, for example, a handheld LMR unit, communicates with the mobile repeater 38, which may be a vehicle repeater, such a repeater provided as part of an emergency vehicle (e.g., a fire truck). The mobile repeater 38 is in communication with a radio unit 20b within the vehicle, for example, an LMR radio mounted within the emergency vehicle. The radio unit 20b communicates with a communication tower 46, such as a radio tower or other communication site that may include a base station (not shown). The communication tower 46 provides communication with, for example, a dispatch unit 48, such as an emergency dispatcher at a remote location. Thus, using the mobile repeater 38, the mobile radio 20a and dispatch unit 48 can communicate through the vehicle radio 20b. Moreover, the mobile radio 20a can be located a distance from the vehicle radio 20b, for example, in an upper floor of a building and still communicate with the dispatch unit 48 via the mobile repeater 38.

Figure 4:
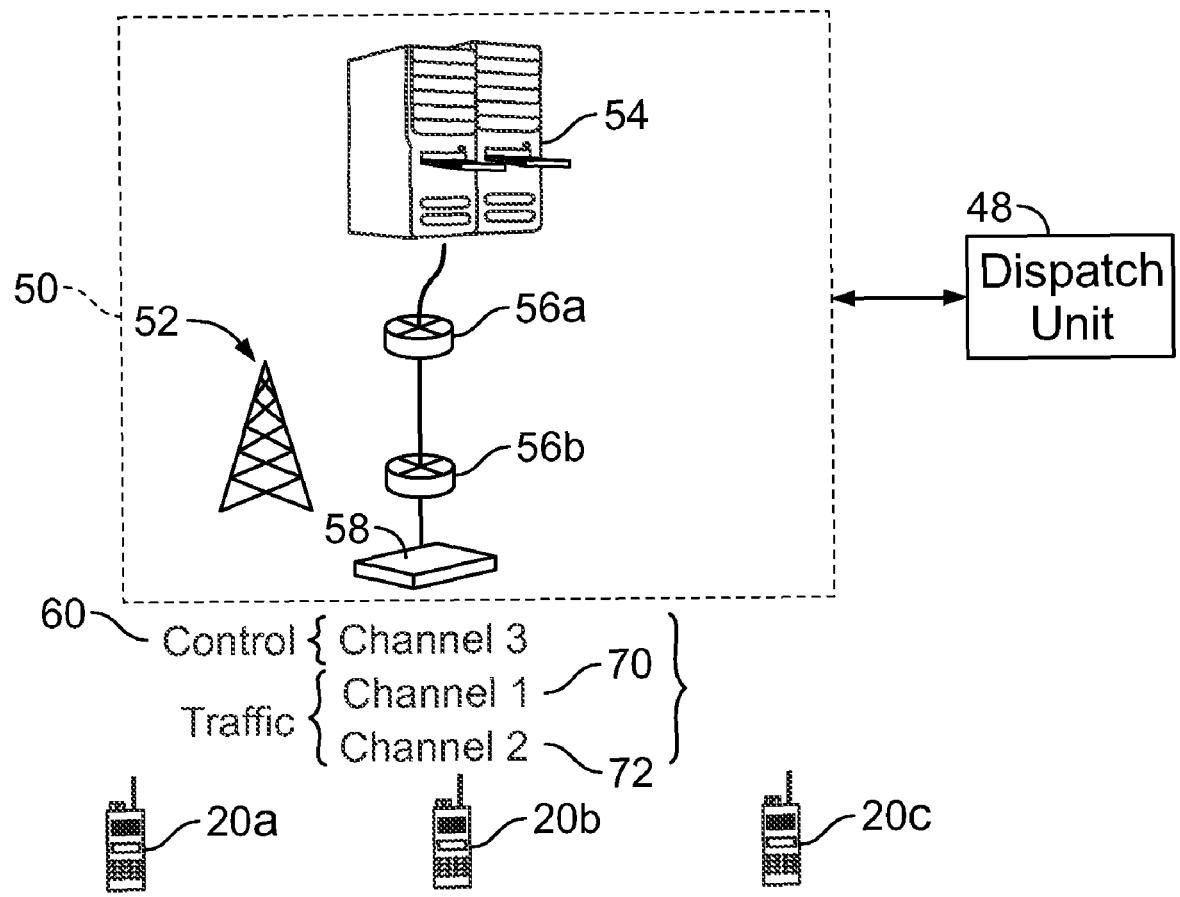
FIG. 4 is a diagram illustrating group radio communications in accordance with various embodiments of the invention.

The radio units 20a and 20b may be configured to communicate on a trunked radio network wherein group communications are provided on shared communication channels as shown in FIG. 4. The radio units 20a and 20b may also communicate with other radio units, for example, the radio unit 20c, as well as the dispatch unit 48. The trunked radio network includes a site controller 50 that controls communications at one or more communication towers 52. The site controller 50 includes a processor 54, for example, a server that is connected to one or more routers 56a and 56b. The one or more routers 56a and 56b are connected to a communication controller 58 that controls communications to and from the radio units 20a-20c.

Call control and signaling information is provided by the communication controller 58 and may include, for example, a control stream of transmitted data that identifies or notifies radio units 20 within the range of the communication tower 52 of all the active calls, such as, all the ongoing open communications, as well as, for example, priority information relating to the priority of incoming and outgoing calls, timing information, frequency information, channel information, etc. For example, the communication controller 58 uses a control channel 60 to identify talk groups, for example, a first talk group (TG1), such as a police department talk group, that is communicating on a first traffic channel 70 (e.g., channel 1) and a second talk group (TG2), such as another police department talk group (e.g., from a different municipality) or a fire department talk group, that is communicating on a second traffic channel 72 (e.g., channel 2). Essentially, a talk group, workgroup or other communication unit communicates using a single channel through a communication tower 52. However, as described in more detail herein, different mobile repeaters 38 communicate based on information provided by and associated with different communication towers 52. As a result, the radio units 20 communicating via the mobile repeater 38 communicate using a frequency of a corresponding communication tower 52. The radio units 20 may subscribe to or communicate using one or more traffic channels assigned to one or more talk groups, workgroups, etc. to which that radio unit 20 is registered.

Thus, the communication controller 58 is assigned a channel for communicating with the routers 56a and 56b to provide inbound signaling from subscribers, namely radio units 20. The communication controller 58 is also assigned a control channel 60 that relays the control information to the radio units 20. The communication controller 58 also provides a plurality of traffic channels 70 and 72 that allow shared communication between radio units 20, for example, in a talk group. It should be noted that the traffic channels 70 and 72 may be assigned to the communication controller 58 from a central location and stored in a memory or alternatively assigned directly by the communication controller 58.

Figure 5:
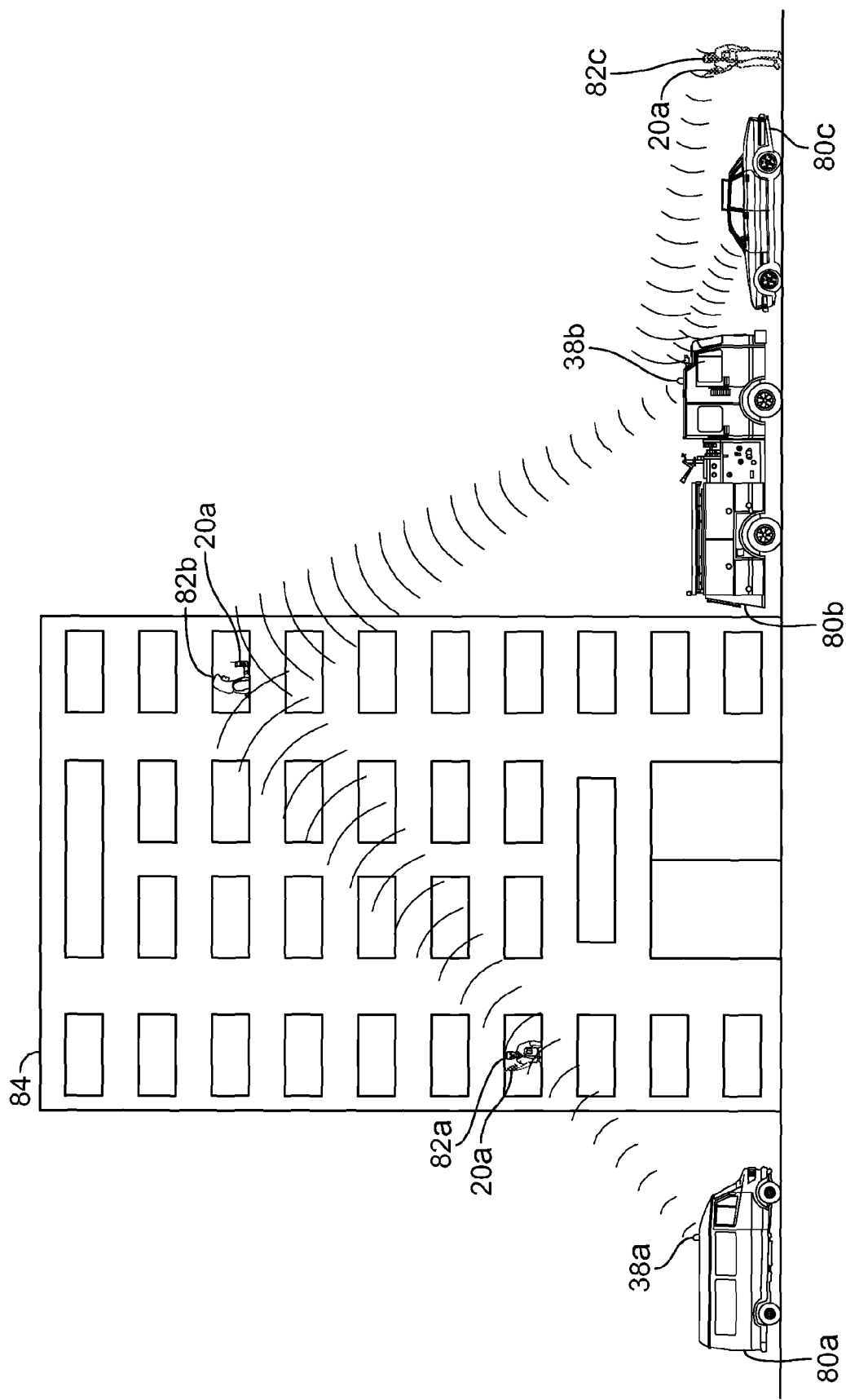
FIG. 5 is a diagram illustrating communications with radio units in a building using mobile repeaters in accordance with various embodiments of the invention.

As shown in FIG. 5, various embodiments of the invention provide communication between a plurality of mobile radio units 20a and, for example, the dispatch unit 48 (shown in FIGS. 3 and 4) using one or more mobile repeaters 38a and 38b located on or in one or more vehicles 80a and 80b, such as emergency vehicles (e.g., one or more ambulances, fire trucks, police cars, etc.). The mobile radio units 20a may be portable or handheld LMR radios that are being carried by individuals 82a and 82b on different floors of a building 84. However, an individual 82c may be located on the ground and also have a radio unit 20a. Moreover, the vehicle radio 20b (shown in FIGS. 3 and 4) may be located in the vehicle 80a and 80b (and thus not shown in FIG. 4), for example, an ambulance and fire truck that each have a mobile repeater 38a and 38b, respectively, for example, on a top of the vehicles 80a and 80b or in a vehicle 80c, for example, a police car that does not include a mobile repeater 38.

In operation the mobile repeaters 38 allow communication between radio units 20a located on different floors of a building 84 and radio units 20a and 20b on the ground, as well as with the dispatch unit 48 (shown in FIG. 3). The mobile repeaters 38 provide communication using a frequency of one of different communication towers 52 (shown in FIG. 4) or communication sites (e.g., a communication channel of an adjacent communication site) that is automatically selected according to various embodiments as described below. More particularly, the various embodiments provide for the automatic selection of a communication frequency for each of the mobile repeaters 38. For example, automatic arbitration or contention resolution for communication of different mobile repeaters 38 is provided. It should be noted that communication between the mobile repeater 38 and communication tower 52 is established using any known communication link initiation process. For example, a mobile repeater 38 may request a channel from a communication tower 52 and is thereafter assigned a channel on a particular frequency for communicating using that communication tower 52. Each communication tower 52 may provide communication using a plurality of different channels on a plurality of different frequencies or provide communication via a plurality of different communication sites.

Figure 6:
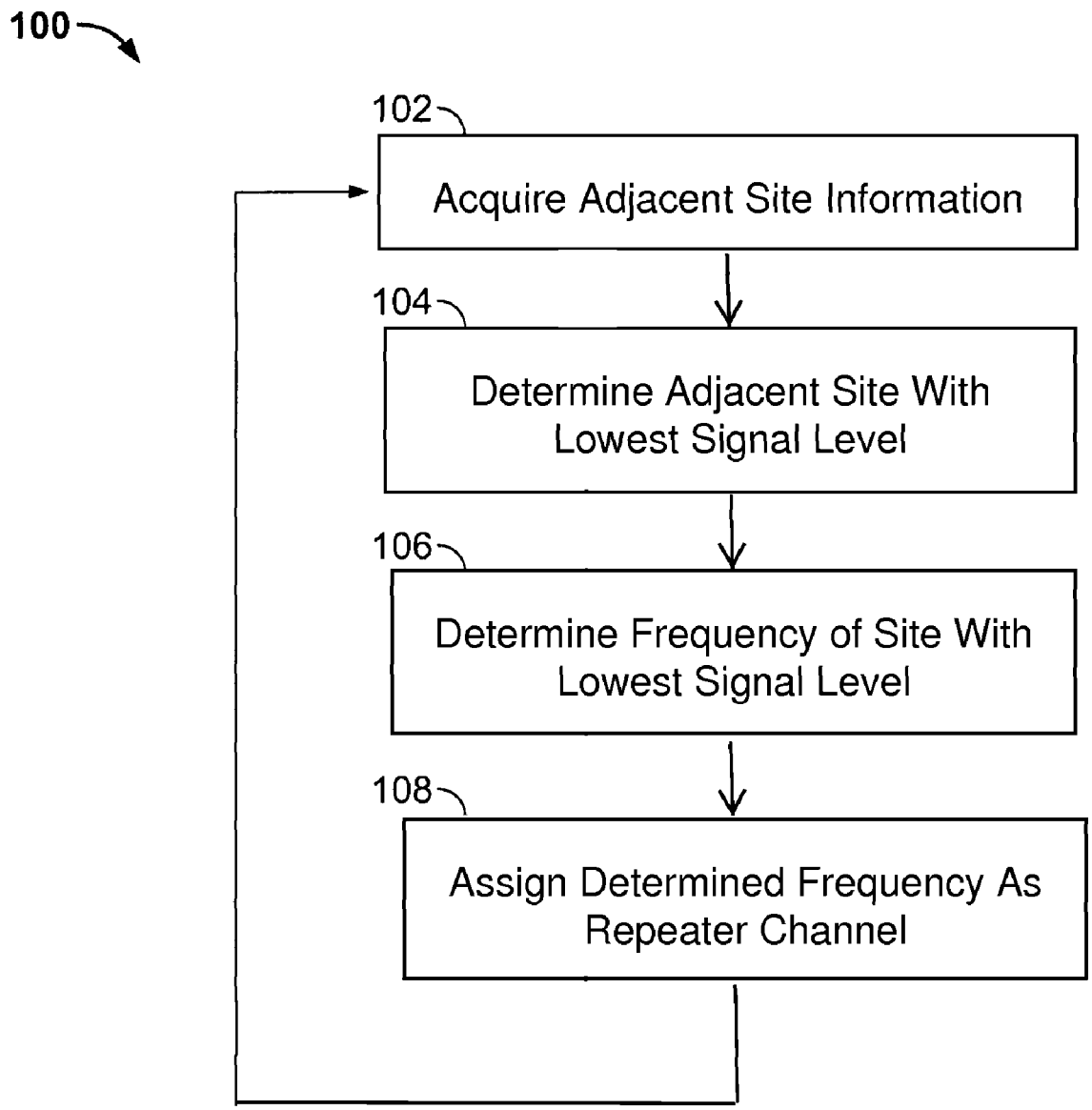
FIG. 6 is a flowchart of a method for automatic selection of a communication frequency on which a mobile repeater communicates in accordance with various embodiments of the invention.

Specifically, as shown in FIG. 6, a method 100 for automatic selection of a communication frequency on which a mobile repeater communicates is provided. The method 100 includes acquiring adjacent site information at 102. For example, in trunked networks, adjacent sites, such as adjacent communication towers broadcast site information over a control channel. Mobile radio units scan for the control channel and accordingly can acquire this site information for all adjacent sites. For example, a control stream of transmitted data can identify or notify radio units within the range of a communication tower of all the active calls, such as, all the ongoing open communications, as well as, frequency information, priority information relating to the priority of incoming and outgoing calls, timing information, channel information, etc. In various embodiments, an adjacent site list may be generated from the adjacent site information. For example, when communicating using one communication tower, that communication tower will communicate on a control channel adjacent site information for each communication site (e.g., other communication towers) within communication range of the current communication tower. This adjacent site information may then be stored as an adjacent site list. The adjacent site list may be stored as a list of each adjacent communication site and a corresponding communication frequency for each one.

It should be noted that other information may also be determined from the control stream. For example, other communication and control information regarding the adjacent communication sites may be determined based on the control stream.

It also should be noted that when reference is made herein to adjacent communication sites, this refers to any communication site or tower in communication range with the current communication site with which the radio unit or mobile repeater is communicating (although not necessarily physically adjacent). For example, adjacent communication cells in a wireless communication system may define the adjacent communication sites.

After a determination is made as to adjacent sites, the signal levels (e.g., RF power or radiated energy) of the adjacent sites are acquired and a determination is made at 104 as to which adjacent communication site has the lowest signal level. The communication site in the adjacent site list with the lowest signal level is the communication site having the lowest RF power or radiated energy. The signal levels of the adjacent communication sites may be determined or identified in any known manner. For example, a ping signal may be sent to the adjacent communication sites and a return signal used to measure the actual signal level of the adjacent communication site or the actual signal level may be measured directly by the radio unit.

The frequency of the adjacent communication site with the lowest signal level is then determined at 106, for example, from the stored adjacent site list. For example, the frequency may be determined from information acquired as part of the control stream as described above or based on a response to a ping message. Thereafter, at 108 the communication frequency for a mobile repeater (e.g., a vehicle repeater) is assigned the frequency of the adjacent communication site having the lowest signal level. This frequency assignment reduces the likelihood that the communication tower with that frequency will interfere with communications from the repeater (as opposed to communication towers having stronger signal levels). Thus, the channel for communication using the mobile repeater is based on the frequency of the adjacent communication site having the lowest signal level.

Accordingly, once the mobile repeater starts communicating on the selected frequency, the mobile repeater mimics the existing adjacent communication site (with the lowest signal level), which may include communicating using a transmission pattern that is the same as an adjacent communication site (e.g., a communication tower). Thus, communications by radio units using the mobile repeater are transparent. However, because the mobile repeater signal level is much stronger than the adjacent communication site in the area surrounding the mobile repeater, radio units in the area of the mobile repeater, for example, in the immediate vicinity, attempt to connect to the mobile repeater instead of the adjacent site (that is also transmitting in the area). Optionally, if the signal level for an adjacent communication site is above a threshold value, the frequency of that adjacent communication site is not assigned to a mobile repeater.

If another mobile repeater is present and requests communication (e.g., requests a communication channel) with a communication site after a previous mobile repeater has established communication, the frequency of the adjacent site previously having the lowest signal level is already assigned to the previous mobile repeater and now will have a higher signal level as a result of radio units communicating using the mobile repeater. Accordingly, the mobile repeater now requesting communication will be assigned a different frequency, for example, a different channel from a different communication site according to the method 100. Thus, additional communication coverage is provided, particularly if the mobile repeaters are located, for example, at different places at the scene of an incident or emergency situation.

It should be noted that if greater control of the frequencies assigned at an incident or emergency scene are desired or required, adjacent site information can be defined and radiated for the communication site including the frequency that is to be used. Accordingly, a phantom site is defined, for example, in the infrastructure adjacency tables, which is adjacent to all other communication sites. All radio units can scan the adjacency tables at predetermined time intervals (e.g., daily) and would not receive any signal and, thus, the radio units will not switch to the phantom site. However, once a mobile repeater is activated, this phantom site's frequency by default is the weakest signal of all the communication sites and the first frequency to be selected.

Thus, various embodiments of the invention provide automatic selection of a communication frequency for a mobile repeater based on adjacent communication site signal level. Thus, automatic arbitration or contention is resolved without any user input or intervention.

The various embodiments or components, for example, the components within the LMRs or the controllers may be implemented as part of one or more computer systems, which may be separate from or integrated with other communication systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling communication using a mobile repeater, the method comprising:
   determining a signal level for each of a plurality of communication sites adjacent the mobile repeater; and
   based on the determined signal levels for the plurality of communication sites adjacent the mobile repeater, assigning to the repeater the frequency of the adjacent communication site having a lowest signal level.

2. A method in accordance with claim 1 wherein determining a signal level comprises determining an adjacent communication site having a lowest signal level.

3. A method in accordance with claim 1 wherein the communication sites are configured to provide trunked radio communications.

4. A method in accordance with claim 1 wherein the repeater comprises a vehicle repeater.

5. A method in accordance with claim 1 further comprising automatically assigning a plurality of communication frequencies to a plurality of repeaters.

6. A method in accordance with claim 1 wherein the frequency is not assigned if the signal level is above a threshold value.

7. A method in accordance with claim 6 wherein assigning a communication frequency to the repeater based on the determined signal levels for the plurality of communication sites adjacent the repeater comprises assigning to the repeater the frequency of the adjacent communication site having a second lowest signal level.

8. A method in accordance with claim 1 further comprising communicating with the repeater using a transmission pattern that is the same as an adjacent communication site.

9. A method in accordance with claim 1 further comprising communicating between mobile radio units and a dispatch unit using the repeater.

10. A method in accordance with claim 9 wherein at least one of the mobile radio units is located on an elevated floor in a building.

11. A method in accordance with claim 9 wherein the repeater comprises a repeater provided as part of an emergency vehicle.

12. A method in accordance with claim 1 further comprising defining a phantom adjacent site defining the frequency to be assigned to the repeater.

13. A method in accordance with claim 1 wherein determining signal level is determined based on a transmitted control stream.

14. A method in accordance with claim 1 wherein adjacent communication sites are determined based on a transmitted control stream.

15. A method in accordance with claim 1 wherein assigning a frequency is performed in a radio unit associated with the repeater.

16. A method in accordance with claim 1 wherein assigning a frequency is performed in the repeater.

17. A method for resolving contention between a plurality of mobile repeaters, the method comprising:
   determining a signal level for each of a plurality of adjacent communication sites; and
   assigning to each of a plurality of mobile repeaters a communication frequency of a communication site having a lowest signal level of the plurality of adjacent communication sites, the communication frequency assigned as a repeater enters an area having another repeater therein.

18. A radio communication system comprising:
   a plurality of repeaters each provided as part of a vehicle;
   a plurality of portable units communicating using the plurality of repeaters; and
   a repeater frequency selector configured to automatically assign communication frequencies to each of the repeaters based on a determined signal level of adjacent communication sites;
   wherein the repeater frequency selector is configured to automatically assign to each repeater a frequency of the adjacent communication site having a lowest signal level.

* * * * *